WIDE BAND AMPLIFIER

Filed Dec. 31, 1953

INVENTOR.
Lawrence J. Mattingly
BY
Mueller & Aichele
Attys.

United States Patent Office 2,807,662

Patented Sept. 24, 1957

2,807,662

WIDE BAND AMPLIFIER

Lawrence J. Mattingly, Lombard, Ill., assignor to Motorola, Inc., Chicago, Ill., a corporation of Illinois Application December 31, 1953, Serial No. 401,683

3 Claims. (Cl. 178—7.5)

Figures 1, 2:
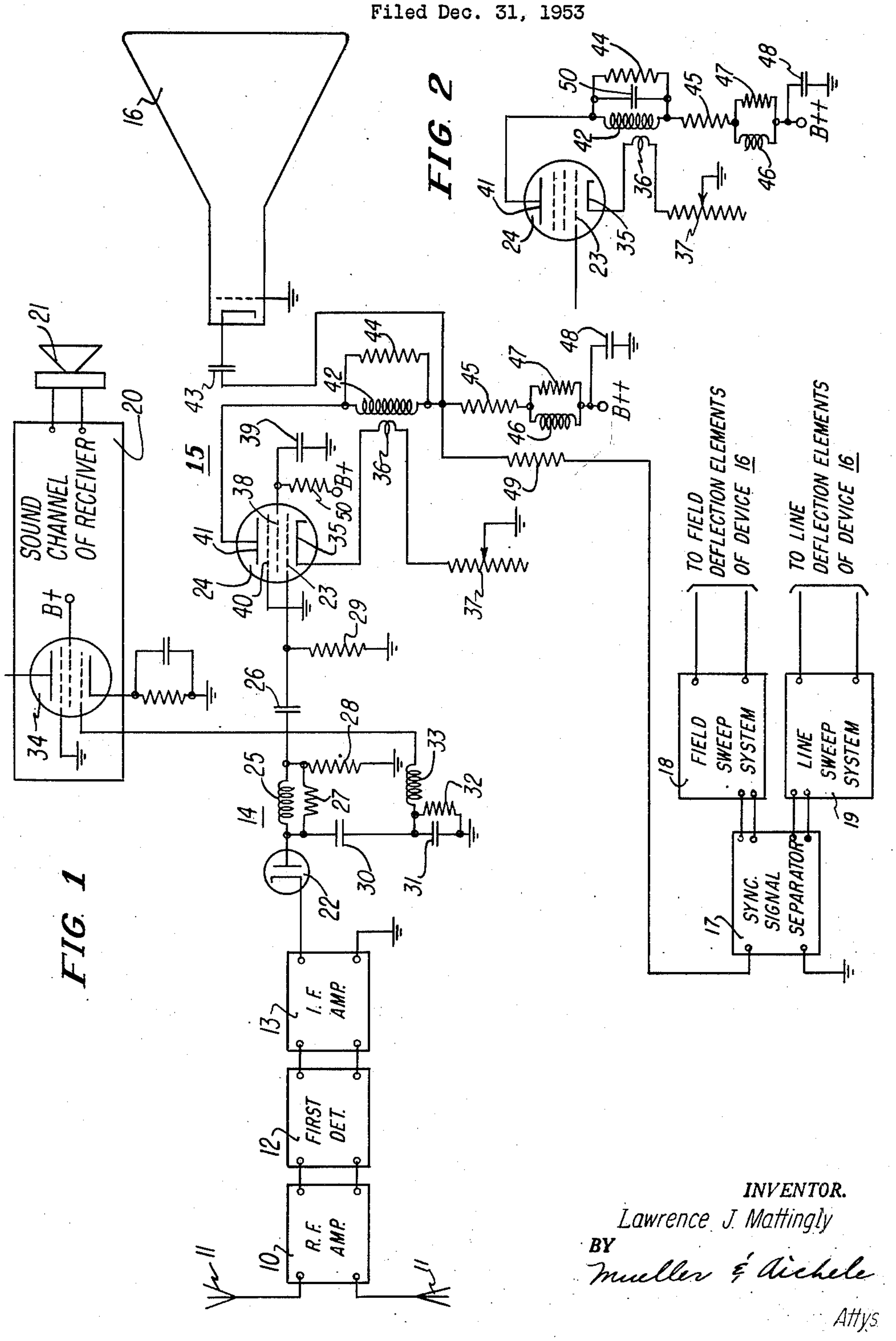

This invention relates to wide band amplifiers for television receivers or the like; and more particularly to a television receiver video amplifier of the type which includes a manually adjustable control element for controlling the gain of the amplifier and, therefore, the contrast of the image reproduced by the receiver.

It is a well-known practice to provide a manual control in a television receiver for adjusting the contrast of the reproduced image. This is usually achieved by controlling the gain of the video amplifier to the receiver. One known expedient for controlling the gain of a video amplifier is the provision of a variable resistor in its cathode circuit. The resistor provides degeneration in the amplifier, and variation of the resistor varies the degeneration and, therefore, the gain of the amplifier.

It has proven to be difficult, however, to construct a video amplifier whose frequency response characteristic is independent of changes in the gain or contrast control. As a consequence, in most prior art arrangements the frequency response characteristic of the amplifier is proper at only one setting of the contrast control, and the amplifier exhibits decreasing high frequency response as the contrast is varied from a minimum to a maximum.

It is, of course, most desirable for the television receiver to provide the best possible picture regardless of the setting of the contrast control. Moreover, the loss of high frequency response at maximum contrast settings leads to a lengthening of noise-pulses and gives the appearance of heavy noise in the reproduced image. Therefore, the images reproduced from weak television signals are rendered even more difficult to perceive, since it is for such signals that the contrast is usually adjusted to a maximum under which condition the video amplifier exhibits its poorest characteristics.

It is well known that variations in the degeneration of an amplifier discharge device varies its input capacity and, therefore, its high frequency response. This variation in input capacity occurs inversely with respect to the changes in degeneration. Because of this, the response of the amplifier to the higher frequency component of the composite video signal amplified thereby varies with changes in the contrast setting. Specifically, when the contrast is varied from a minimum to a maximum, the lessening degenerative effect of the contrast resistor causes an increase in input capacity of the amplifier with resulting increased attenuation of the higher video frequency components.

The provision of video frequency peaking networks in the input or output circuit of the amplifier does not obviate this situation and these networks are, at best a compromise. Although the peaking networks may be designed to provide the proper high frequency response at maximum contrast, they produce over-peaking for minimum contrast, which, in turn, produces unfavorable transient response and undesired phase shifting. On the other hand, when these networks are designed to provide the proper high frequency response for minimum contrast, there is insufficient compensations for maximum contrast.

It is, accordingly, an object of the present invention to provide an improved video amplifier whose gain may be adjusted throughout a contrast range, and which is constructed to exhibit a substantially uniform frequency response to all the components of the video signal translated by the amplifier throughout the entire contrast range.

Another object of the invention is to provide an improved video amplifier that uses relatively few components, and which is constructed in a simple and expedient manner to exhibit a substantially uniform response to the video frequency signals translated thereby and which may be adjusted through a contrast range without affecting materially the uniformity of the frequency response of the amplifier.

A feature of the invention is the provision of a video amplifier that includes a contrast control for introducing degeneration into the amplifier to control the gain thereof, and which also includes a frequency selective regenerative feed-back network for opposing the degeneration for the higher frequency video components and by an increasing amount as the degeneration is reduced.

Another feature of the invention is the provision of such a frequency selective regenerative feed-back network that is constructed to exhibit an anti-resonant point so as to be degenerative at the frequency of the inter-carrier sound component of the television signal, so that the amplifier is highly degenerative at that frequency and substantially unresponsive thereto.

The above and other features of the invention, which are believed to be new, are set forth with particularity in the appended claims. The invention itself, however, together with further objects and advantages thereof may best be understood by reference to the following description when taken in conjunction with the accompanying drawing in which:

Figure 1 shows a television receiver including an embodiment of the improved video amplifier of the invention; and Figure 2 is a fragmentary representation of a portion of the video amplifier incorporating a modification of the invention.

The invention provides an amplifier for a video signal having components extending through a selected frequency range, and the amplifier includes an electron discharge device and an input circuit for applying the video signal to the device. Means including a variable impedance element is coupled to the device for producing degeneration therin so as to control the gain of the amplifier. An output circuit is coupled to the device for deriving the video signal therefrom in amplified form, and a frequency selective regenerative feed-back network is coupled from the output circuit for feeding back to the input of the device components of the video signal occuring over a portion of the selected frequency range.

The television receiver shown in Figure 1 includes a radio frequency amplifier 10 of any desired number of stages. The amplifier has input terminals connected to an appropriate antenna 11, and has a pair of output terminals coupled through a first detector 12 to an intermediate frequency amplifier 13. Amplifier 13 is coupled to a second detector 14, and the second detector is coupled through a video amplifier 15 to the input electrodes of a cathode-ray image-reproducing device 16.

Video amplifier 15 is coupled to a synchronizing signal separator 17 which, in turn, is coupled to a field sweep system 18 and to a line sweep system 19. The output terminals of sweep systems 18 and 19 are coupled, respectively, to the field deflection elements and line deflection elements of reproducing device 16.

Video amplifier 15 is also coupled to the sound channel 20 of the receiver and the output terminals of the sound channel are connected to a usual sound reproducing device 21.

The various stages of the receiver shown in block form in themselves form no part of the present invention and, for that reason, have not been illustrated in detail. Such components may have any usual and well-known internal connections and may be intercoupled by any of the extremely well-known expedients. The present invention resides in video amplifier 15, and that amplifier has been shown in circuit form and will be described in detail hereinafter. The circuit for second detector 14 and for a portion of the driver stage of sound channel 20 have also been shown to aid in the explanation of the invention.

The portion of the television receiver thus far described is extremely well-known. Briefly, a television signal having present day standardized video synchronizing and intercarrier sound components may be intercepted by antenna 11. The intercepted signal is amplified in radio-frequency amplifier 10 and heterodyned to the intermediate frequency of the receiver in first detector 12, with the resulting intermediate frequency signal being amplified in amplifier 13.

The amplified intermediate frequency signal from amplifier 13 is detected in second detector 14 to produce a composite video signal including components extending through a selected frequency range. The video signal is amplified in amplifier 15 and applied to the input electrodes of image-reproducing device 16 to control the intensity of the cathode ray beam in that device in accordance with the picture intelligence. The intercarrier sound component is derived in detector 14 in well-known manner, and this component is utilized by the sound channel 20 of the receiver. The sound channel amplifies and demodulates the intercarrier sound component and enables device 21 to reproduce the sound intelligence of the television signal.

The synchronizing components of the television signal are separated in separator 17 from the composite video signal, and are used to synchronize the field and line sweep systems 18 and 19 in a well-known manner. Second detector 14 includes a rectifying element 22, which may have the form of a diode, crystal or other semiconductor device. The intermediate frequency amplifier 13 is coupled to the input electrode of rectifying element 22 in well-known manner. The output electrode of the element is coupled to the control electrode 23 of an electron discharge device 24 through a peaking coil 25 and a coupling capacitor 26. The peaking coil 25 is shunted by a damping resistor 27, the junction of coil 25 and capacitor 26 is connected to ground through a load resistor 28, and control electrode 23 is connected to ground through grid-leak resistor 29.

The output electrode of rectifying element 22 is coupled to ground through a pair of series-connected capacitors 30, 31; capacitor 30 being shunted by a resistor 32. The junction of capacitors 30 and 31 is connected through an inductance coil 33 to the control electrode of an electron discharge device 34. Device 34 is connected in well-known manner as an amplifier driver stage for the sound channel. The circuit connections of this device and the manner in which it is coupled to the succeeding stages in the sound channel are extremely well-known and a detailed illustration of these connections is believed to be unnecessary.

Discharge device 24 is included in video amplifier 15, and the device has a cathode 35 connected to a point of reference potential or ground through an inductance coil 36 and through a variable impedance contrast control such as variable resistor 37, connected in series therewith. The screen electrode 38 of device 24 is connected to the positive terminal B+ of a source of unidirectional potential through a dropping resistor 50 and is by-passed to ground through a capacitor 39. The suppressor electrode 40 of device 24 is connected to ground, and the anode 41 of the device is coupled to the input electrodes of image-reproducing device 16 through a peaking coil 42 and a coupling capacitor 43. Coil 42 is shunted by a damping resistor 44, and the side of that coil remote from the anode is connected through a resistor 45 and a peaking coil 46 to the positive terminal B++ of a source of unidirectional potential. Coil 46 is shunted by a damping resistor 47, and terminal B++ is by-passed to ground through a capacitor 48. Connection to the synchronizing signal separator 17 is made from the junction of coil 42 and resistor 45 and through a resistor 49. Coil 42 is inductively coupled to coil 36, and the latter constitutes a frequency-selective feedback network for feeding the higher frequency video signal components to the cathode 33 in regenerative phase.

In this manner, device 24 has an input circuit connected between control electrode 23 and ground for impressing video signal components extending through a selected frequency range on the device to be amplified thereby. The device also includes an output circuit connected between anode 41 and ground for deriving the amplified video signal component and for impressing such components upon device 16. Device 24 also includes a cathode circuit connecting cathode 35 to ground, and this circuit includes the frequency-selective regenerative feedback coil 36 and the variable resistor 37. Resistor 37, as previously stated, functions as a contrast control and variations of this resistor introduce variable degeneration into the device 24.

As previously stated, the second detector 14 demodulates the received television signal to produce a composite video signal including video components extending through a selected frequency range. This composite signal also includes synchronizing components and an intercarrier sound component. The latter component, by present day standards, has a frequency of 4.5 megacycles. The composite video signal appears across the detector load resistor 28, and this signal is applied to the control electrode 23 of discharge device 24 by the input circuit 26, 29 described above. The intercarrier sound component is applied to the control electrode of device 34 in the sound channel by network 31, 32 and 33, this network, in conjunction with the input capacity of device 34, being tuned to the frequency of this component.

Peaking coils 42 and 46 are included in the output circuit so that the amplifier may exhibit a uniform response characteristic throughout the entire frequency range of the video signal components. Without the frequency-selective regenerative feedback network including coil 36, the changes of input capacity of device 23 as the degenerative gain control 37 is varied would alter the high frequency response characteristic of the amplifier. This causes the peaking coils to produce over-peaking of the higher frequency video signal components with resulting undesired transients and phase shifts at some settings of the contrast control, and causes these coils to provide insufficient compensation at other settings.

In accordance with the present invention, however, the inductive coupling of coil 36 to coil 42 responds to the higher frequency video signal components and feeds such components in regenerative phase into the cathode circuit. As control 37 is adjusted towards maximum gain, these components are fed back in an increasing amount. Therefore, as control 37 is adjusted to increased contrast through decreased degeneration, the ever-increasing regenerative feedback of the high frequency video signal component opposes tendency of the response characteristics of the amplifier to drop. Coil 36 is formed by a few turns of wire around coil 42, and the inductive coupling between these coils is such that for the lower frequency video components the feedback is insignificant. However, for the higher frequency video components, the regenerative feedback compensates for the drop in the response characteristics of the amplifier as control 37 is adjusted towards maximum gain.

In the manner described above, peaking coils 42 and 46 can be designed to produce substantially uniform response over the entire video frequency range at, for example, the minimum contrast setting of control 37, and the regenerative feedback network of coil 36 compensates for any drop in this response as the contrast is increased and degeneration is decreased.

The circuit of Figure 2 is essentially similar to that of Figure 1, with the exception that inductance coil 42 in the circuit of Figure 2 is shunted by capacitor 50. This capacitor has a selected value to cause the resulting network to pass through an anti-resonant point at the frequency of the intercarrier sound component which, by present day standards, is 4.5 megacycles. At this frequency, therefore, the feedback signal undergoes a phase shift and is degenerative. Therefore, the amplifier is highly degenerative to the intercarrier sound component and any vestiges of this component that might reach the video amplifier are suppressed therein and do not reach reproducing device 16.

The invention provides, therefore, an improved video amplifier which incorporates a variable contrast control its its cathode circuit to control the gain of the amplifier, and which also includes a simple regenerative feedback connection for compensating any variation in the high frequency response characteristic of the amplifier as its gain is adjusted.

In a constructed embodiment of the invention, the circuit components were given the following values and these values are listed herein merely by way of example and are not intended to limit the invention in any way:

| | |
|---|---|
| B++ | 250 volts. |
| B+ | 150 volts. |
| Capacitor **30** | 12 micro-micro-farads. |
| Capacitor **31** | 22 micro-micro-farads. |
| Resistor **32** | 470 kilohms. |
| Coil **33** | 150 micro-henries. |
| Coil **25** | 270 micro-henries. |
| Resistor **27** | 10 kilohms. |
| Resistor **28** | 4.7 kilohms. |
| Capacitor **26** | 0.1 micro-farads. |
| Resistor **29** | 1 megohm. |
| Peaking coil **42** | 200 micro-henries. |
| Resistor **44** | 10 kilohms. |
| Resistor **45** | 3.9 kilohms. |
| Peaking coil **46** | 450 micro-henries. |
| Resistor **47** | 1200 ohms. |
| Resistor **49** | 22 kilohms. |
| Capacitor **50** | 8 micro-micro-farads. |

While a particular embodiment of the invention has been shown and described, modifications may be made, and it is intended in the appended claims to cover all such modifications as fall within the true spirit and scope of the invention.

I claim:

1. In a television receiver for utilizing a television signal and which includes a detector for producing a composite video signal in response to such a television signal, which composite signal includes video frequency components extending through a selected frequency range, and a cathode-ray image reproducer responsive to the composite signal for reproducing an image; a video amplifier interposed between said detector and said reproducer for amplifying the composite signal with essentially uniform response through the selected frequency range, said amplifier including in combination, an electron discharge device having an anode, a cathode and a control electrode; an input circuit for the amplifier coupled to the detector and connected to said control electrode and to a point of reference potential; means including a variable contrast control resistor connected between said cathode and said point of reference potential for producing degeneration in said device to control the gain of the amplifier and thereby control the contrast of the image reproduced by the reproducer, with variations in said resistor producing variations in the input capacity of said device and producing resulting variations in the response of the amplifier in the high frequency end of the selected frequency range; an output circuit coupling said anode to the reproducer; and a frequency selective feedback network coupled to said output circuit for supplying said video frequency components of said composite signal in the high frequency end of the selected range to said cathode in regenerative phase and in an amount varying with the variations of said contrast control so as to compensate for the varying response of the amplifier to such high frequency video components upon variations of such control.

2. In a television receiver for utilizing a television signal and which includes a detector for deriving a composite video signal which includes video frequency components extending through a selected frequency range, and a cathode-ray image reproducer responsive to the composite signal for reproducing an image; a video amplifier interposed between said detector and said reproducer for amplifying the composite signal with essentially uniform response through the selected frequency range, said amplifier including in combination, an electron discharge device having an anode, a cathode, and a control electrode; an input circuit for the amplifier coupled to the detector and connected to said control electrode and to a point of reference potential; means including a variable contrast control resistor connected between said cathode and said point of reference potential for producing degeneration in said device to control the gain of the amplifier and thereby control the contrast of the image reproduced by the reproducer, with variations in said resistor producing variations in the input capacity of said device and producing resulting variations in the response of the amplifier in the high frequency end of the selected frequency range of said video frequency components; an output circuit for the amplifier including first and second peaking coils connected in series to said anode, means connecting the junction between said coils to the reproducer; and a feedback coil inductively coupled to said first peaking coil for supplying said video frequency components of said composite signal in the high frequency end of the selected range to said cathode in regenerative phase and in an amount varying with the variations of said contrast control so as to compensate for the varying response of the amplifier to such high frequency video components upon variations of such control.

3. The combination recited in claim 2 including a capacitor connected across said first peaking coil to form a resonant network tuned to a selected frequency to cause signals of said frequency to be fed back to said cathode in such phase to provide degenerative action in the amplifier.

References Cited in the file of this patent

UNITED STATES PATENTS

| | | |
|---|---|---|
| 2,220,770 | Mayer | Nov. 5, 1940 |
| 2,504,175 | Bradley | Apr. 18, 1950 |
| 2,577,461 | Greefkes | Dec. 4, 1951 |
| 2,584,332 | Crooker | Feb. 5, 1952 |